(12) United States Patent  
Caveney et al.

(10) Patent No.: US 8,172,470 B2
(45) Date of Patent: May 8, 2012

(54) METHODS AND APPARATUS FOR MEASURING INSERTION LOSS IN A FIBER OPTIC CABLE CONNECTION

(75) Inventors: Jack E. Caveney, North Palm Beach, FL (US); Brett Lane, Hinsdale, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 13/041,488

(22) Filed: Mar. 7, 2011

(65) Prior Publication Data

US 2011/0149272 A1 Jun. 23, 2011

Related U.S. Application Data

(62) Division of application No. 12/399,314, filed on Mar. 6, 2009, now Pat. No. 7,929,123.

(60) Provisional application No. 61/034,387, filed on Mar. 6, 2008.

(51) Int. Cl.
*G02B 6/255* (2006.01)
(52) U.S. Cl. ........................................................ 385/95
(58) Field of Classification Search ............... 356/43; 385/95–99
See application file for complete search history.

(56) References Cited

U.S. PATENT DOCUMENTS

| 4,360,268 | A |   | 11/1982 | Zucker et al. |
| 4,765,816 | A |   | 8/1988 | Bjornlie et al. |
| 5,011,252 | A |   | 4/1991 | Thorncraft et al. |
| 5,341,448 | A | * | 8/1994 | Huebscher .................... 385/97 |
| 6,141,098 | A |   | 10/2000 | Sawatari et al. |
| 6,758,609 | B2 |   | 7/2004 | Fathi et al. |
| 7,104,702 | B2 | * | 9/2006 | Barnes et al. .................. 385/77 |
| 7,192,195 | B2 |   | 3/2007 | Turner |
| 2007/0147741 | A1 | * | 6/2007 | Meek et al. .................... 385/55 |
| 2007/0172179 | A1 | * | 7/2007 | Billman et al. ................ 385/99 |
| 2007/0274657 | A1 | * | 11/2007 | Billman et al. .............. 385/134 |

* cited by examiner

*Primary Examiner* — Michael P Stafira
(74) *Attorney, Agent, or Firm* — Robert A. McCann; Christopher S. Clancy; Christopher K. Marlow

(57) ABSTRACT

A method and apparatus for measuring the insertion loss of a fiber optic connection is provided. The invention generally comprises a light source providing light to a test connector which contains a juncture of two fiber optic cables. The test connector has one or more opaque portions surrounding the fiber optic juncture. A pyrometer or other heat detection means is then used to measure any temperature increase as a result of light scattered into the opaque portions of the test connector.

4 Claims, 1 Drawing Sheet

METHODS AND APPARATUS FOR MEASURING INSERTION LOSS IN A FIBER OPTIC CABLE CONNECTION

CROSS-REFERENCE TO RELATED APPLICATION

This application is a divisional of U.S. patent application Ser. No. 12/399,314, filed Mar. 6, 2009, which claims priority to U.S. Provisional Patent Application No. 61/034,387, filed Mar. 6, 2008, the subject matter of which is hereby incorporated herein by reference in its entirety.

FIELD OF THE INVENTION

The present invention relates generally to fiber optic connections and more specifically to a novel apparatus and method to measure the performance of a fiber optic connection.

BACKGROUND OF THE INVENTION

In order to determine the adequacy of a fiber optic connection, such as the fiber optic connection disclosed in U.S. Pat. No. 7,011,454 which is herein incorporated by reference in its entirety, it is useful to measure the insertion loss of the fiber optic connection in order to verify that it is within acceptable limits. U.S. Pat. No. 4,360,268 (the '268 patent) discloses the use of an integrating sphere to directly measure the amount of scattered light at a single point radial to the fiber optic juncture. U.S. Pat. No. 7,192,195 (the '195 patent) discloses the use of one or more fiber optic strands to collect light and guide it to a measurement device. However, even measuring the scattered light at multiple locations still may not enable an accurate measurement of the total amount of scattered light because the light may not scatter evenly or in the direction of the finite number of light collecting points. Thus, it is unlikely that the total amount of scattered light will be measured by a limited number of light collecting points.

As a result, it is desirable to provide a method and apparatus that can measure the total amount of scattered light without extrapolating the total amount from a limited number of light collecting locations.

SUMMARY OF THE INVENTION

The present invention generally comprises a light source supplying light to a test connector which contains a juncture of two fiber optic cables. The test connector has one or more opaque portions surrounding the fiber optic juncture. A pyrometer or other heat detection means is then used to measure any temperature increase as a result of light scattered into and absorbed by the opaque portions of the test connector.

DETAILED DESCRIPTION OF THE PREFERRED EMBODIMENTS

Figure 1:
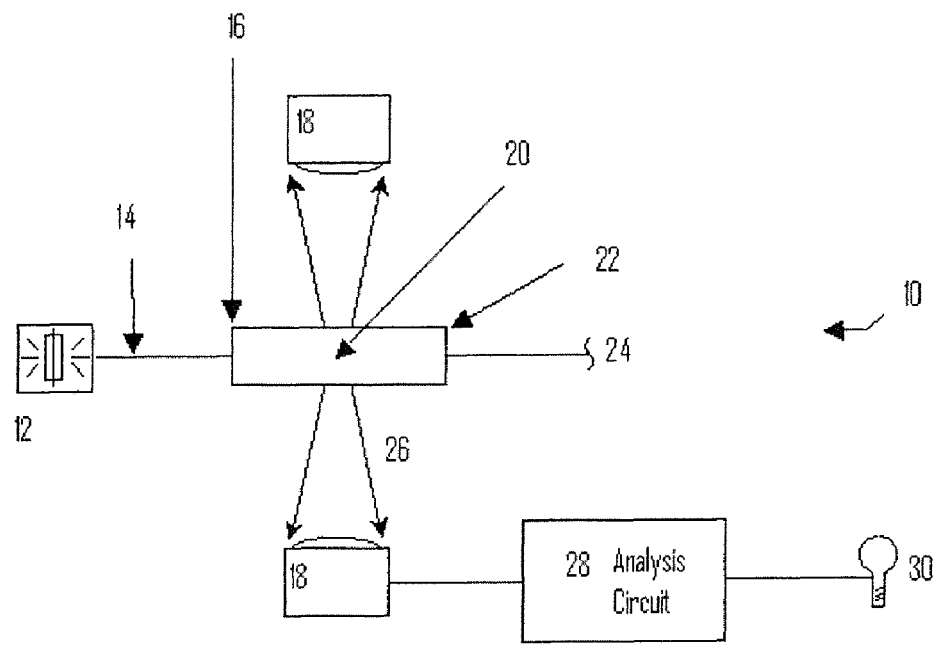
FIG. 1 is a system overview of a method and apparatus for measuring insertion loss in a fiber optic connection.

As shown by FIG. 1, one embodiment of an apparatus 10 to measure the performance of a pre-polished fiber optic connector comprises a light source 12 that can supply light with at least a portion of the light's emission spectrum in the infrared region of the electromagnetic spectrum. While one embodiment supplies light with a portion in the infrared region of the electromagnetic spectrum, any frequency in which light can be easily and efficiently transmitted by a fiber optic cable and be absorbed by opaque materials in a test connector (as described below) may be employed in embodiments of the present invention. The light source 12 may be comprised of a relatively narrowband emitter, such as a semiconductor LED or laser, or a relatively broadband emitter, such as a gas discharge arc lamp or filament lamp.

The light source 12 supplies light to a test connector 22. The light is transferred from the light source 12 to the test connector 22 via a coupling assembly 14. In one embodiment, the coupling assembly 14 comprises a fiber optic cable connected to the light source 12 at one end and a test connector interface 16, which can comprise a fiber optic adapter, at the other end. In another embodiment, the coupling assembly 14 is composed of free space optical components such as lenses and apertures.

As the light from the light source 12 reaches the test connector 22 it will either be coupled to the field fiber 24 or be scattered into opaque portions of the test connector 22 that are adjacent to the stub fiber and field fiber interface 20. The light that is scattered into the test connector 22 will be absorbed by the opaque portions of the test connector 22 and cause a temperature increase in those opaque portions. The amount of the temperature increase will be dependant upon the amount of light scattered into the test connector 22. Index matching gel may be used to enhance the coupling of the light at the stub fiber and field fiber interface 20. Additionally, the geometry and composition of the index matching gel and surrounding opaque portions may be optimized to facilitate efficient heat transfer and detection.

The temperature of the opaque portions of the test connector 22 can be measured by a pyrometer 18. The pyrometer 18 can be placed in close proximity to the opaque portion of the test connector 22 in order to increase the accuracy of the temperature measurement. The resulting temperature can be compared to temperature measurements before the light source was energized and the resulting temperature difference can be used to determine the amount of light that is scattered into the opaque portions of the test connector 22. An analysis circuit 28 can be used to determine the temperature difference and the insertion loss of the connection. The analysis circuit 28 can utilize the peak temperatures measured by the pyrometers 18 after the light source 12 has been turned on for a predetermined time and subsequently turned off to determine the insertion loss of the connection. The analysis circuit 28 can then use the insertion loss to see if it falls within acceptable pass/fail parameters and indicate the result with an auditory or visual pass/fail indicator 30.

Figure 2:
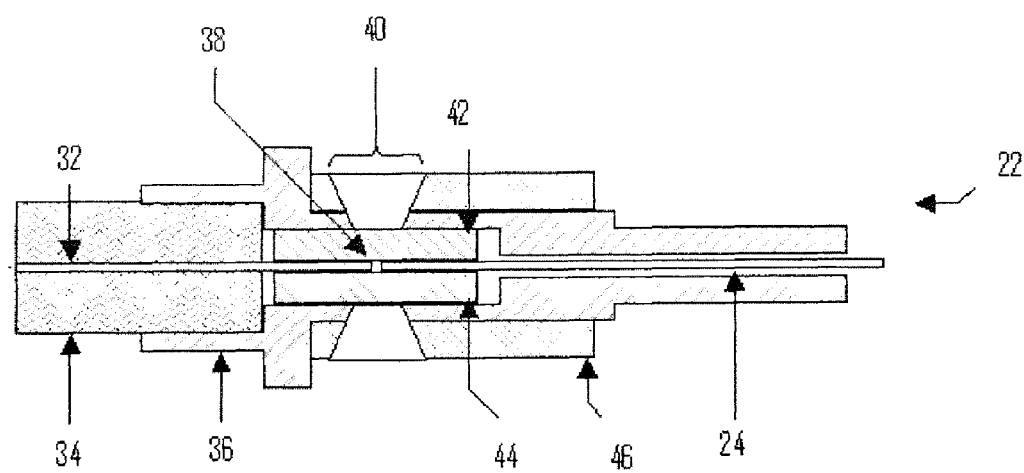
FIG. 2 is a cross sectional view of a test connector for use in the method and apparatus of claim 1.

FIG. 2 shows a cross sectional view of one embodiment of a test connector 22. A stub fiber 32 passes through a ferrule 34. The stub fiber 32 is then mated to the field fiber 24. The stub fiber 32 and field fiber 24 interface is secured between a top plank 42 and bottom plank 44. In this embodiment, the top plank 42 and bottom plank 44 are the opaque portions of the test connector 22 which absorb the scattered light. The ferrule 34, top plank 42, and bottom plank 44 are secured together by a ferrule holder 36 and cam 46. The ferrule holder 36 and cam 46, have a measurement window 40 which may allow a pyrometer or similar device to measure the temperature of the top plank 42 and bottom plank 44 and thus, measure the amount of scattered light as a result of the increase in temperature.

In this embodiment, the light that is not coupled from the stub fiber 32 to the field fiber 24 is scattered into and through the index matching gel 38 to the top plank 42 and bottom plank 44. As a result, the temperature of the top and bottom planks 42, 44 will increase. The resulting increase in temperature will be related to the amount of scattered light allowing the measurement of the temperature difference to measure the amount of scattered light.

In order to enhance the ability of the top plank 42 and bottom plank 44 or other opaque portions of the test connector 22 to absorb light and to emit radiation, the top plank 42 and bottom plank 44 can be fabricated from a substance having desirable absorption and emission properties. For example, the planks can incorporate nanomaterials exhibiting an efficacious ability to absorb light and emit infrared radiation. Alternatively, the planks can be coated with a substance having the desirable absorption and emission characteristics. Additionally, in a test apparatus where multiple fiber types are to be accommodated (i.e., multimode, singlemode, etc.), independent fiber-specific embodiments may be integrated into the same instrument.

The invention claimed is:

1. A test connector for use in an apparatus for measuring insertion loss in a fiber optic cable connection between a stub fiber and a field fiber comprising:
   a junction between the stub fiber and the field fiber;
   opaque portions immediately surrounding and enclosing the junction; and at least one measurement window exposing the opaque portions.

2. The test connector of claim 1 wherein the opaque portions comprise a top plank and a bottom plank.

3. The test connector of claim 2 further comprising a cam, a ferrule, and a ferrule holder wherein the stub fiber is inserted through the ferrule.

4. The test connector of claim 3 wherein the at least one measurement window comprises first and second measurement windows, the first and second measurement windows formed in the cam and the ferrule holder such that the first measurement window exposes the top plank and the second measurement window exposes the bottom plank.

* * * * *